United States Patent [19]

Glauser et al.

[11] 4,081,083
[45] Mar. 28, 1978

[54] AUTOMATIC SUBWAY COUPLER

[75] Inventors: Wilbert Gordon Glauser, Alden; Walter Cabble Dilg, Elma, both of N.Y.

[73] Assignee: Dresser Industries, Inc., Dallas, Tex.

[21] Appl. No.: 720,190

[22] Filed: Sep. 3, 1976

[51] Int. Cl.² .............................................. B61G 5/08
[52] U.S. Cl. ..................................... 213/76; 277/180; 285/63; 285/355
[58] Field of Search ...................... 213/76, 1.3; 285/63, 285/332.2, 351, 355; 277/180; 403/288; 285/DIG. 19

[56] References Cited

U.S. PATENT DOCUMENTS

| | | | |
|---|---|---|---|
| 1,094,612 | 4/1914 | Tomlinson | 213/76 |
| 1,813,125 | 7/1931 | Robinson | 285/63 |
| 2,900,199 | 8/1959 | Logan | 285/DIG. 19 |
| 2,934,217 | 4/1960 | Simmons et al. | 213/76 |
| 3,061,321 | 10/1962 | Smith | 277/180 |
| 3,255,891 | 6/1966 | Cope | 213/76 X |
| 3,462,161 | 8/1969 | Daubenberger et al. | 277/180 X |

Primary Examiner—Barry L. Kelmachter
Attorney, Agent, or Firm—Raymond T. Majesko

[57] ABSTRACT

An air line connector for use on an automatic coupler having a combination seal in the form of an apertured seal holder containing annular grooves in a front and rear face with seal members therein and a locating seal member about the diametral periphery of the holder.

5 Claims, 5 Drawing Figures

AUTOMATIC SUBWAY COUPLER

In subway couplers it is common practice to mount one or more air lines at the coupler head for providing a continuity of air between subway cars when complementary couplers on each are mated. The air line is usually flexible and is often attached to a cylindrical air line connector which may be in the form of an elbow for diverting the air line away from the coupler shank. The air line connector is attached to a bushing which passes through the head of the coupler and opens at its face for mating.

A seal means is disposed at the connection between the air line connector and bushing and in the past this has been in the form of a rubber like or composition gasket. As the coupler moves through the motions in train service, the hose attached to the connector is whipped back and forth. This creates a good deal of vibration and strain on the seal means and also imposes a twisting moment on the connection between the bushing and the air line connector. This, of course, permitted loosening of the connection and leaking of the air.

Accordingly, it is among the objects of the invention to provide a permanent weather or moisture-proof, leak-proof and vibration-proof seal that would seal rough machined surfaces or parts with rough machined surfaces, and could be re-used if the parts are disassembled.

Figure 1:
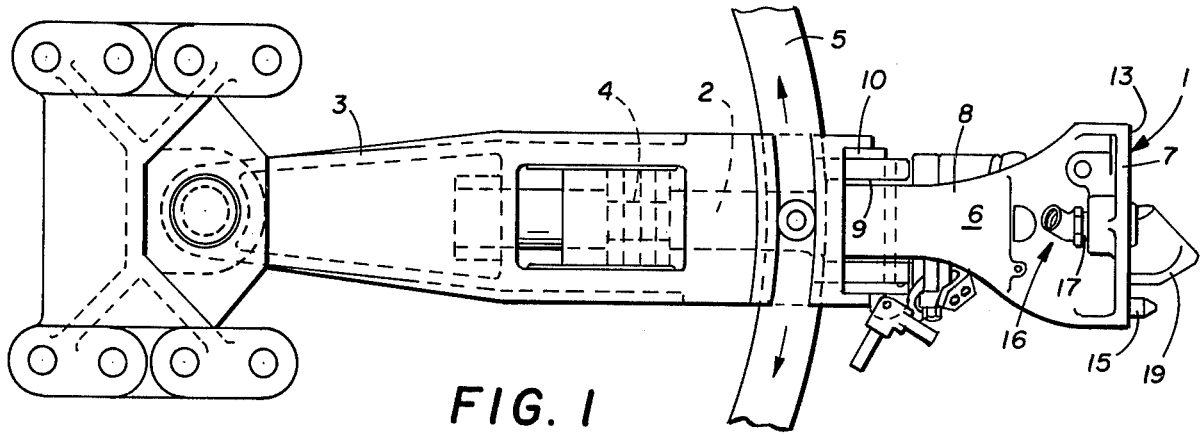
FIG. 1 is a plan view of a subway coupler containing an air line connector.
Figure 2:
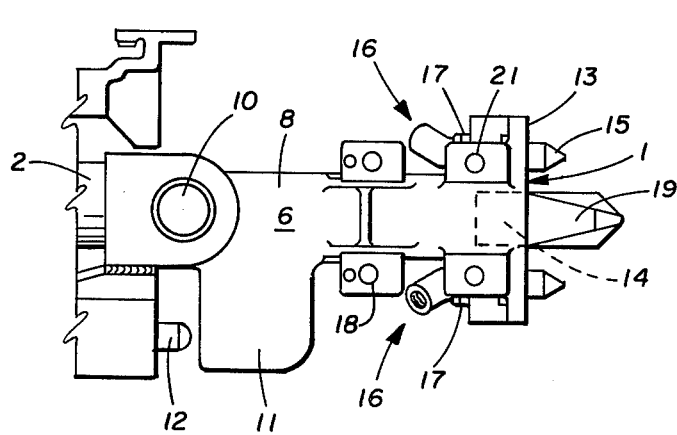
FIG. 2 is an elevation view of a portion of the coupler of FIG. 1.
Figure 4:
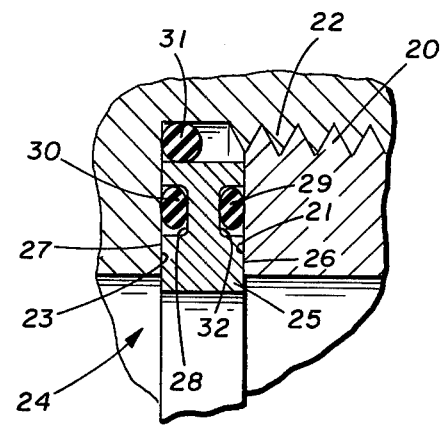
FIG. 4 is an enlarged section taken from FIG. 3.
Figure 3:
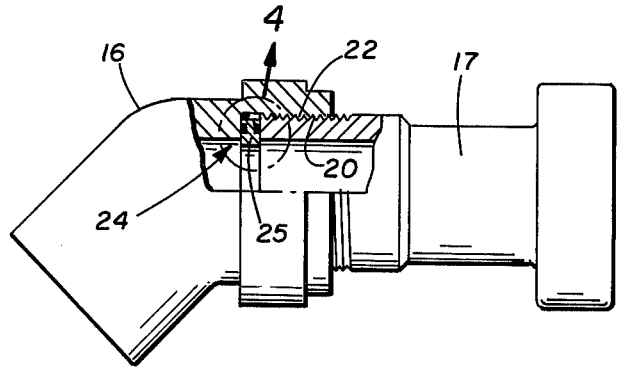
FIG. 3 is a plan view, partially in cross-section, of an air line connector attached to a bushing and employing the sealing means of the present invention.
Figure 5:
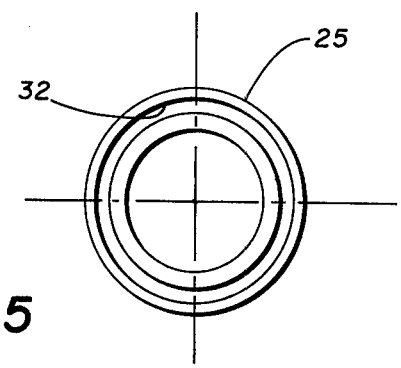
FIG. 5 is a detail of the sealing means holder as viewed along the axis of the bushing.

In accordance with the present invention, there is provided a sealing means comprising flat ring seal holders having a front face and a rear face. The front and rear faces contain an annular groove. There is an annular seal member disposed therein and a seal member is disposed about the periphery of the holder.

Perferably, the seal holder is circular and the seal members are O-rings.

Referring to the drawings, the improved automatic subway coupler 1 of the present invention may be long bodied for containing a suitable cushioning device and telescopingly received in a drawbar universally connected to the car. However, for more freedom in its vertical movement, the coupler is preferred to be relatively short bodied and pivotally connected for relative vertical swinging to a yoke 2 in a drawbar 3 which contains both the yoke and a rubber or other suitable cushioning device 4. The coupler is pivotally connected for horizontal swinging to the underside of the body of a subway or the like car, and is supported forwardly of its pivotal connection on a radial carrier bar 5 suspended from the car body.

The coupler has a body 6 comprised of a head 7 and shank 8, the latter having at its butt end opposite the head a horizontally apertured hinge loop 9 for pivotal connection for relative vertical swinging to a pin 10 on the front end of the yoke. Depending from the loop 9 is an integral arm 11, which by engagement with a forwardly acting, spring-pressed plunger 12 depending from the yoke 2 holds the coupler normally at a coupling height and yieldably resists its downward swinging.

Designed to couple with either a counterpart or a conventional subway coupler, the coupler 1 has its head 7 projecting above and below its shank 8. On the head there is a vertically directed front face 13 which is interrupted centrally by a laterally elongated slot 14 to accommodate its draft hook and to gather and accommodate the draft hook of a mating coupler in an interlocking and coupled relationship. For interlocking the head to that of another coupler, there are provided adjacent corners at one side of the face 13, guide pins 15 and adjacent the opposite corners at the other side, sockets for interfitting respectively, with corresponding socket and guide pins of another coupler, the guide pins being conically tipped to perform a final gathering function for final coupling alignment.

The air connections 16 for the train air service lines are made through the front face 13 of the head 7 by spring pressed bushings 17 extending longitudinally through the head, preferably above and below the slot 14 and the adjoining part of the shank 8 and threaded rearwardly of the head for attachment of the air line connector.

In keeping with its ability to couple or connect automatically with a coupler of another car and simultaneously connect the air and the electrical train service lines between the cars, the coupler 1 not only has the bushing 17 for the air service lines, but, depending on the desired number and location of the electrical couplings has at the sides of its head 7 andajoining part of its shank 8 drilled holes or threaded sockets 18 for bolting and so mounting on the coupler one or more boxes each containing an insulator block mounting the electrical contacts.

The laterally elongated slot 14 interrupting the front face 13 of the head 7 opens rearwardly into a cavity in the hollow shank 8 of the body 6 and it accommodates the coupler's hook 19.

Regarding the train air line connection 16, the bushing 17 contains an outer threaded surface 20 terminating in an outer bearing vertical surface 21. The elbow-shaped air line connector contains an inner threaded surface 22 terminating in a recessed vertical bearing surface 23.

The threaded surfaces are connected and the sealing means 24 is disposed between the bearing surfaces.

The sealing means 24 comprises a flat ring seal holder 25 having a front and rear face 26 and 27. Both the front and rear faces contain an annular groove, 28 and 32, in which an O-ring, 29 and 30, is disposed. An O-ring 31 is also disposed about the diametral periphery of the holder.

It is intended that the foregoing description and drawings be construed as illustrative and not in limitation of the invention.

The embodiment of the invention in which an exclusive property or privilege is claimed are defined as follows:

1. In an automatic subway coupler having a body comprising a head with a front face, a shank extending from the head and having a butt end opposite the head with an apertured loop for pivotal connection, a hook extending from the front face, at least one air line connector in the form of an apertured cylindrical conduit connected rearwardly of the head to a bushing extending longitudinally through the head to the front face for mating with a similarly constructed coupler and a sealing means between the bushing and air line connector, the improvement comprising the bushing containing an outer threaded surface terminating in an outer bearing vertical surface, the air line connector containing an inner threaded surface terminating in a recessed vertical bearing surface, said threaded surfaces being connected and said sealing means being disposed between the bearing surfaces, said sealing means comprising a circular flat ring and seal holder having a front face and a rear face, said front and rear faces containing an annular groove with an annular seal member disposed therein and a seal member disposed about the diametral periphery of said holder.

2. The coupler of claim 1 in which the seal members are O-rings.

3. The coupler of claim 1, in which the air line connector is in the form of an elbow.

4. An air line connector in the form of an apertured cylindrical conduit having an inner threaded surface terminating in a recessed vertical bearing surface for use on a head of an automatic coupler, said connector having a sealing means adjacent the recessed vertical surface, said sealing means comprising a flat circular ring seal holder having a front face and a rear face, said front and rear faces containing an annular groove with an annular seal member disposed therein and a seal member disposed about the diametral periphery of said holder, said connector being adapted to be connected to a bushing on the coupler which contains an outer threaded surface terminating in an outer bearing vertical surface, said threaded surfaces being connected and said sealing means being disposed between the bearing surfaces.

5. The connector of claim 4, in which the air line connector is in the form of an elbow.

* * * * *